US007191409B2

(12) United States Patent
Petersen

(10) Patent No.: US 7,191,409 B2
(45) Date of Patent: Mar. 13, 2007

(54) METHOD AND APPARATUS FOR PROGRAMMING HOT KEYS BASED ON USER INTERESTS

(75) Inventor: Paul R. Petersen, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 299 days.

(21) Appl. No.: 09/733,373

(22) Filed: Dec. 8, 2000

(65) Prior Publication Data

US 2002/0070924 A1 Jun. 13, 2002

(51) Int. Cl.
*G06F 3/00* (2006.01)

(52) U.S. Cl. ............... 715/827; 715/744; 715/745; 345/172

(58) Field of Classification Search ............... 345/765, 345/764, 760, 168, 172, 744, 745, 747; 715/51.3, 715/505.1, 760, 866, 827
See application file for complete search history.

(56) References Cited

U.S. PATENT DOCUMENTS 6,292,172 B1 * 9/2001 Makhlouf ............... 345/157
6,421,675 B1 * 7/2002 Ryan ..................... 707/100
6,487,538 B1 * 11/2002 Gupta et al. ............ 705/14
6,525,748 B1 * 2/2003 Belfiore .................. 345/855
6,563,770 B1 * 5/2003 Kokhab .................. 369/30.08
6,834,294 B1 * 12/2004 Katz ...................... 709/203
2002/0156870 A1 * 10/2002 Boroumand et al. ...... 709/219

* cited by examiner

*Primary Examiner*—Kieu D. Vu
(74) *Attorney, Agent, or Firm*—TraskBritt

(57) ABSTRACT

A system is provided that configures a computer keyboard hot key based upon user interests. The system determines a profile of interests for a user, selects a web site address to associate with the hot key, and programs the hot key with the selected web site address. Depressing the hot key causes a web browser to navigate to a web site located at the web site address. Determining the profile of interests for the user can involve: asking the user a series of questions, and forming the profile based upon the answers, or can involve examining a list of preferred web sites visited by the user, and forming the profile based upon web sites in the list. A computer system distributor can receive compensation from an owner of the web site for directing the user to the web site. An icon can also be programmed with the web site address.

12 Claims, 3 Drawing Sheets

METHOD AND APPARATUS FOR PROGRAMMING HOT KEYS BASED ON USER INTERESTS

BACKGROUND

1. Field of the Invention

The present invention relates to computer systems and web sites. More specifically, the present invention relates to a method and an apparatus for programming hot keys on a computer system keyboard to direct a web browser to a selected web site, wherein the selection is based upon interests of a computer user.

2. Related Art

As use of the Internet continues to expand at an exponential rate, millions of new users are accessing the Internet for the first time each month. Unfortunately, many of these new users have little familiarity with computer systems, and are often intimidated by the cryptic syntax that is often required to navigate to web sites.

In order to simplify the process of accessing web sites, some computer system distributors have begun to incorporate "hot keys" into computer system keyboards. These hot keys are additional keys, beyond standard alphanumeric and symbolic keys, that enable a computer system user to immediately access web sites associated with the keys. For example, when a computer user activates a hot key, the computer system begins running a web browser, if the web browser is not already running. Next, the web browser is automatically directed to an address of a web site that is associated with the hot key. In this way, a user is able to access a web site with a single activation of a hot key on the computer system keyboard.

These hot keys are typically associated with web sites belonging to affiliates of the computer system distributor, and the computer distributor typically receives some type of compensation for facilitating easy navigation to these web sites.

Unfortunately, hot keys are presently programmed for specific web sites without regard to the interests of the computer system user. Hence, a computer system user is provided with a hot key, even if the user has no interest in the web site associated with the hot key. Conversely, a web site owner can end up paying to provide a hot key to users who are unlikely to use the hot key to access the web site.

What is needed is a method and an apparatus for programming a hot key based upon the interests of a user of a computer system.

SUMMARY

One embodiment of the present invention provides a system that configures a hot key on a keyboard of a computer system based on interests of a user of the computer system. The system operates by determining a profile of interests for the user of the computer system. The system uses this profile to select a web site address to be associated with the hot key on the keyboard of the computer system from a set of possible web site addresses that can be associated with the hot key. Next, the system programs the hot key with the selected web site address, so that depressing the hot key causes a web browser on the computer system to navigate to a web site located at the web site address.

In one embodiment of the present invention, determining the profile of interests for the user involves asking the user a series of questions, and then forming the profile based upon answers to the series of questions.

In one embodiment of the present invention, the series of questions are asked during an initialization process for the computer system.

In one embodiment of the present invention, determining the profile of interests for the user involves examining a list of preferred web sites visited by the user, and then forming the profile based upon web sites in the list.

In one embodiment of the present invention, a computer system distributor receives compensation from an owner of the web site for directing the user to the web site.

In one embodiment of the present invention, the set of possible web site addresses includes addresses of web sites belonging to corporate partners of a distributor of the computer system.

In one embodiment of the present invention, the system additionally receives an update to the set of possible web site addresses from across a network. This update is used to change the set of possible web site addresses within the computer system.

In one embodiment of the present invention, the system additionally allows the user to explicitly program the hot key with a user-specified web site address.

In one embodiment of the present invention, the hot key is replaced with a user-selectable icon on a computer system display.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact disks) and DVDs (digital versatile discs or digital video discs).

Computer System

Figure 1:
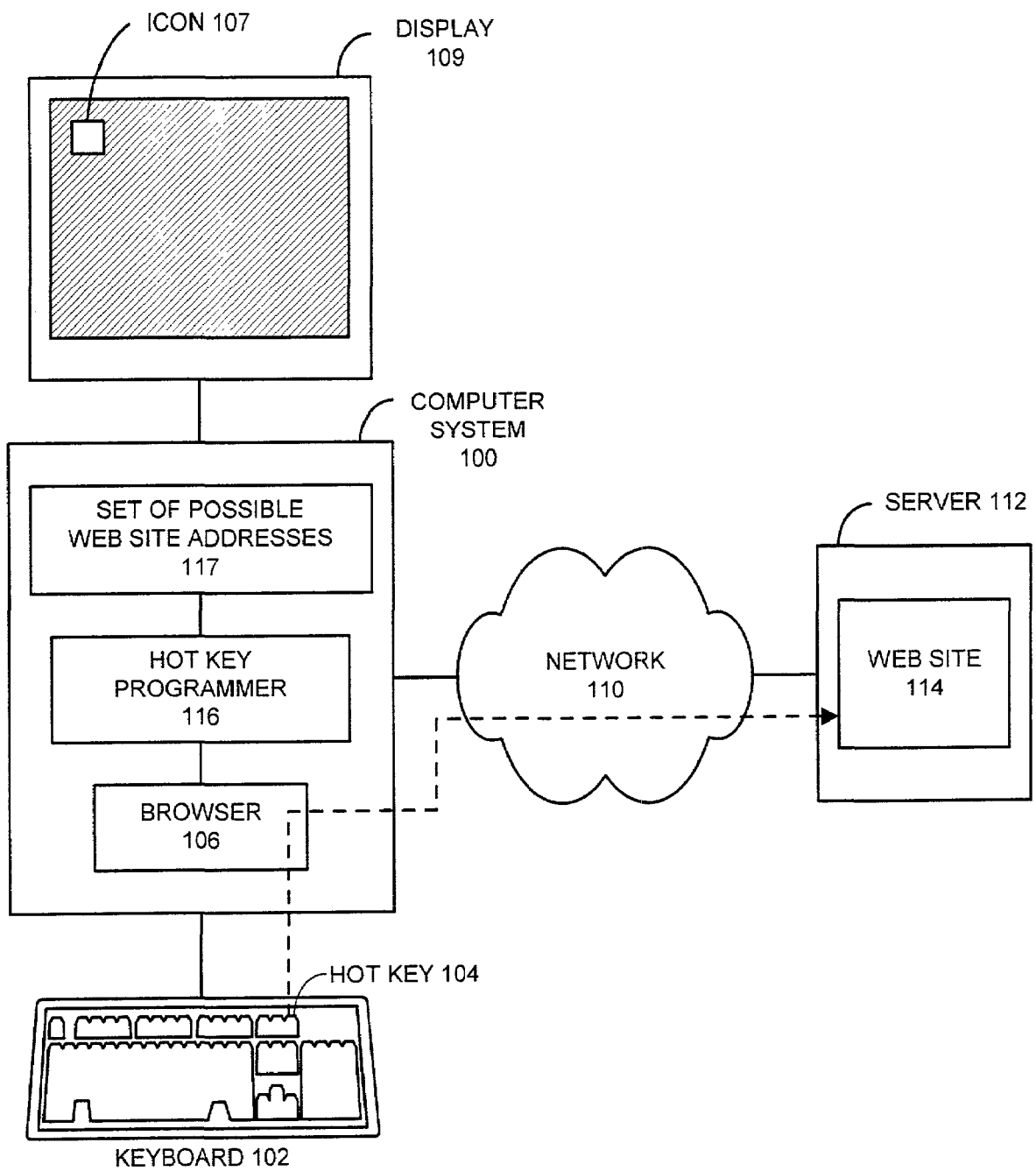
FIG. 1 illustrates a computer system accessing a web site in accordance with an embodiment of the present invention.

FIG. 1 illustrates a computer system 100 accessing a web site 114 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes a web browser 106. Web browser 106 can include any type of web browser capable of viewing a web site, such as the INTERNET EXPLORER™ browser distributed by the Microsoft Corporation of Redmond, Wash.

In one embodiment of the present invention, computer system 100 includes a keyboard 102. Keyboard 102 includes at least one hot key 104, in addition to standard keyboard keys. Hot key 104 can be used to directly navigate to web site 114, as is described in more detail below with reference to FIGS. 2–4.

In another embodiment of the present invention, computer system 100 includes an icon 107 within a display 109. By selecting icon 107 (for example, by using a mouse), a user can also directly navigate to web site 114.

Computer system 100 additionally includes a hot key programmer 116 along with a set of possible web site addresses 117 to associate with hot keys. This enables hot key 104 (or icon 107) to be selectively associated with different web site addresses from the set of possible web site addresses 117 based upon user interests, as is described below with reference to FIGS. 2–4. Note that the set of possible web site addresses 117 can include web sites of corporate partners of the distributor of computer system 100.

Computer system 100 is coupled to server 112 through network 110. Network 110 can generally include any type of wire or wireless communication channel capable of coupling together computing nodes. This includes, but is not limited to, a local area network, a wide area network, or a combination of networks. In one embodiment of the present invention, network 110 includes the Internet.

Server 112 can include any computational node including a mechanism for servicing requests from a client for computational and/or data storage resources. More specifically, server 112 hosts web site 114, which contains inter-linked pages of textual and graphical information that can be accessed through web browser 106 within computer system 100.

Process of Programming a Hot Key

Figure 2:
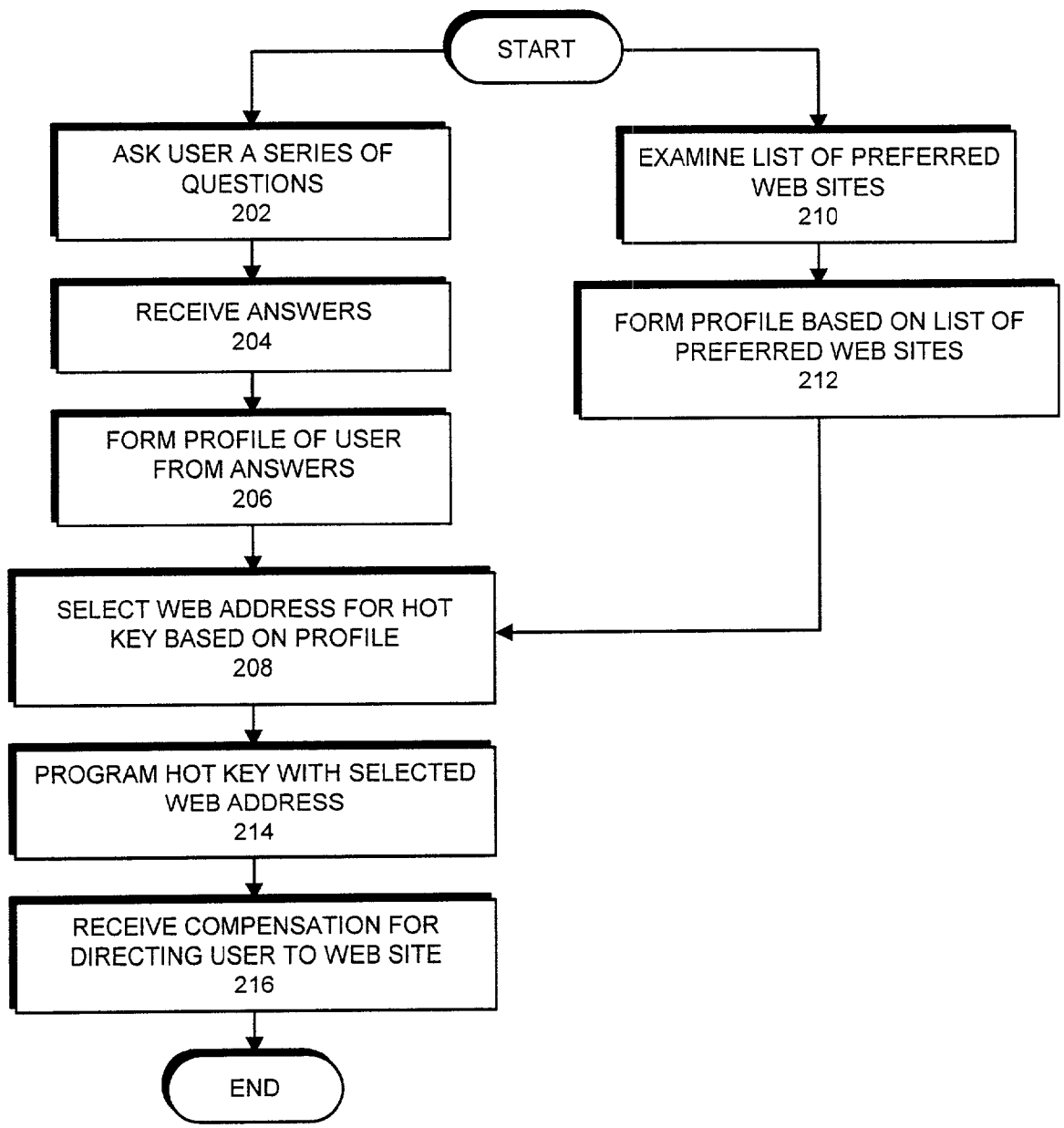
FIG. 2 is a flow chart illustrating the process of programming a hot key based upon user interests in accordance with an embodiment of the present invention.

FIG. 2 is a flow chart illustrating the process of programming a hot key 104 based upon interests of a user in accordance with an embodiment of the present invention.

In one embodiment of the present invention, the system starts by asking the user a series of questions in order to determine interests of the user (202). Note that these questions can be asked during a system initialization process that takes place when the user logs on to computer system 100 for the first time. Next, computer system 100 receives answers to the questions from the user (204), and then uses the answers to form a profile of interests of the user (206).

In another embodiment of the present invention, hot key programmer 116 within computer system 100 examines a list of preferred web sites visited by the user (210), and then forms a profile for the user based upon the contents of the list of preferred web sites (212). Note that the list of preferred web sites can be obtained by examining a "favorites" folder containing Universal (or Uniform) Resource Locators (URLs), which is maintained by web browser 106 in order to allow the user to easily navigate to the preferred web sites. Web browser 106 can alternatively keep a record of web sites commonly visited by the user.

After obtaining a profile for the user, the system selects a web site address to be associated with hot key 104 from the set of possible web site addresses 117 based upon the profile (208). For example, the system can ask the user to identify what type of music the user is interested in from a list of options containing: classical, rock, jazz and country. Based upon the selected option, hot key 104 can be programmed to direct web browser 106 to different web sites specializing in specific music genres. Alternatively, hot key 104 can be programmed to direct web browser 106 to different locations within a single music web site specializing in different music genres.

Next, hot key 104 (or icon 107) is programmed with a selected web address 214 so that when the user depresses hot key 104, web browser 106 is directed to the selected web address 214. Note that if web browser 106 is not running when hot key 104 is depressed, web browser 106 is first launched before being directed to the selected web address 214.

Finally, a distributor of computer system 100 may receive compensation 216 from the owner of web site 114 for directing web browser 106 to web site 114. Note that there exist an almost unlimited number of compensation schemes that may be used with the present invention. For example, compensation may be based upon a flat fee for each user directed to web site 114, or may be based upon a percentage of purchases arising from users directed to web site 114. This compensation may also be based upon the number of keyboards that get programmed with a hot key to web site 114.

Process of Updating Set of Possible Web Sites

Figure 3:
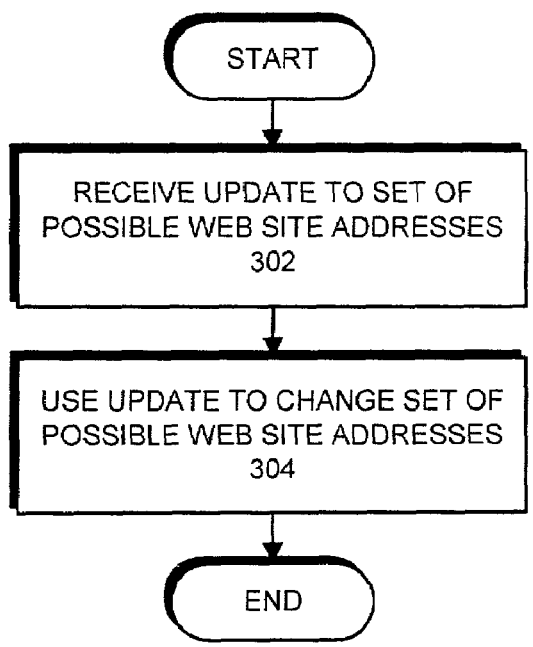
FIG. 3 is a flow chart illustrating the process of updating the set of possible web sites in accordance with an embodiment of the present invention.

FIG. 3 is a flow chart illustrating the process of updating the set of possible web sites in accordance with an embodiment of the present invention. Note that financial arrangements between the computer system distributor and different corporate partners can change over time and web site addresses can change over time. Hence, it is advantageous to provide some mechanism for updating the set of possible web site addresses 117 that can be associated with hot key 104.

To this end, computer system 100 can periodically receive an update to the set of possible web site addresses 117 across network 110 (302). Computer system 100 can then use this update to change the set of possible web site addresses 117 (304).

This updating process can be configured to take place automatically on a periodic basis or, alternatively whenever the set of possible web site addresses 117 changes.

Process of Allowing a User to Explicitly Program a Hot Key

Figure 4:
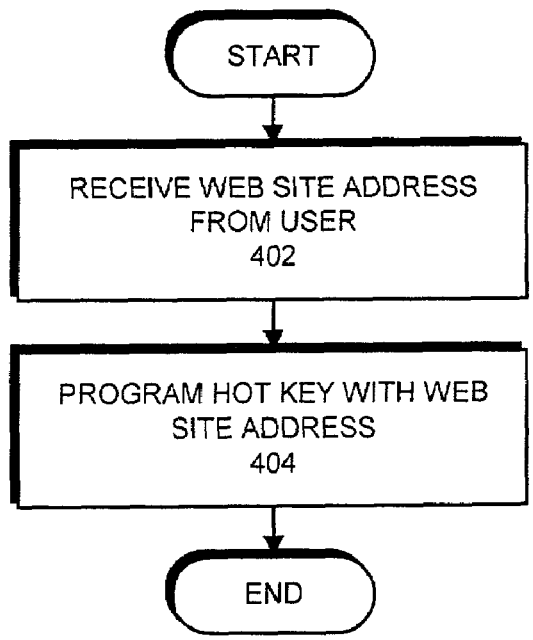
FIG. 4 is a flow chart of the process of allowing a user to explicitly program a hot key in accordance with an embodiment of the present invention.

In some cases, the user would like the ability to explicitly program a hot key to go to a specific web address. Referring to FIG. 4, the system can provide this ability by receiving a selection of a web site address from the user (402), and then programming hot key 104 to direct web browser 106 to the selected web site address (404).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for programming a hot key on a keyboard of a computer system based upon interests of a user of the computer system, comprising: determining a profile of interests for the user of the computer system by:
examining a list of preferred web sites visited by the user, wherein the list of preferred web sites is located on the computer system and maintained by a web browser to allow the user to easily navigate to the preferred web sites; and
creating the profile of interests on the computer system based upon the list of preferred web sites, wherein the profile of interests is created by converting the list of preferred web sites into personal information that is stored on the computer system;
selecting a web site address to be associated with the hot key on the keyboard of the computer system by using the profile of interests to automatically select the web site address from a set of possible web site addresses located on the computer system that can be associated with the hot key;
updating the set of possible web site addresses to reflect changes in financial arrangements between a computer system distributor and different corporation partners; and
programming the hot key with the selected web site address, so that depressing the hot key causes a web browser on the computer system to navigate to a web site located at the web site address.

2. The method of claim 1, further comprising receiving compensation for directing the user to the web site from an owner of the web site.

3. The method of claim 1, wherein the set of possible web site addresses includes addresses of web sites belonging to corporate partners of a distributor of the computer system.

4. The method of claim 1, further comprising: receiving an update to the set of possible web site addresses at the computer system from across a network; and
using the update to change the set of possible web site addresses within the computer system;
wherein the update reflects changes in financial arrangements between the computer system distributor and different corporation partners.

5. A computer-readable storage medium storing instructions that when executed by a computer cause the computer to perform instructions for programming a hot key on a keyboard of a computer system based upon interests of a user of the computer system, the instructions comprising:
determining a profile of interests for the user of the computer system by:
examining a list of preferred web sites visited by the user, wherein the list of preferred web sites is located on the computer system and maintained by a web browser to allow the user to easily navigate to the preferred web sites; and
creating the profile of interests on the computer system based upon the list of preferred web sites, wherein the profile of interests is created by converting the list of preferred web sites into personal information that is stored on the computer system;
selecting a web site address to be associated with the hot key on the keyboard of the computer system by using the profile of interests to automatically select the web site address from a set of possible web site addresses located on the computer system that can be associated with the hot key;
updating the set of possible web site addresses to reflect changes in financial arrangements between a computer system distributor and different corporation partners; and
programming the hot key with the selected web site address, so that depressing the hot key causes a web browser on the computer system to navigate to a web site located at the web site address.

6. The computer-readable storage medium of claim 5, wherein the method further comprises receiving compensation for directing the user to the web site from an owner of the web site.

7. The computer-readable storage medium of claim 5, wherein the set of possible web site addresses includes addresses of web sites belonging to corporate partners of a distributor of the computer system.

8. The computer-readable storage medium of claim 5, wherein the method further comprises:
receiving an update to the set of possible web site addresses at the computer system from across a network; and
using the update to change the set of possible web site addresses within the computer system;
wherein the update reflects changes in financial arrangements between the computer system distributor and different corporation partners.

9. An apparatus comprising a processor that facilitates programming a hot key on a keyboard of a computer system based upon interests of a user of the computer system, comprising:
a profile determining mechanism that is configured to determine a profile of interests for the user of the computer system during a system initialization operation by:
examining a list of preferred web sites visited by the user, wherein the list of preferred web sites is located on the computer system and maintained by a web browser to allow the user to easily navigate to the preferred web sites; and
creating the profile of interests on the computer system based upon the list of preferred web sites, wherein the profile of interests is created by converting the list of preferred web sites into personal information that is stored on the computer system;
a selecting mechanism that is configured to automatically select a web site address from the profile of interests to be associated with the hot key on the keyboard of the computer system;
wherein the selecting mechanism is configured to use the profile of interests for the user in selecting the web site address from a set of possible web site addresses located on the computer system that can be associated with the hot key;
wherein the set of possible web site addresses is updated to reflect changes in financial arrangements between a computer system distributor and different corporation partners; and
a programming mechanism that is configured to program the hot key with the selected web site address, so that depressing the hot key causes a web browser on the computer system to navigate to a web site located at the web site address.

10. The apparatus of claim 9, further comprising a compensation receiving mechanism that is configured to receive compensation for directing the user to the web site from an owner of the web site.

11. The apparatus of claim 9, wherein the set of possible web site addresses includes addresses of web sites belonging to corporate partners of a distributor of the computer system.

12. The apparatus of claim 9, further comprising a web site address updating mechanism that is configured to:

receive an update to the set of possible web site addresses at the computer system from across a network; and use the update to change the set of possible web site addresses within the computer system;

wherein the update reflects changes in financial arrangements between the computer system distributor and different corporation partners.

* * * * *